March 2, 1926.
L. A. GROLEMUND
GLASS CUTTER'S TABLE
Filed Nov. 12, 1923
1,574,965
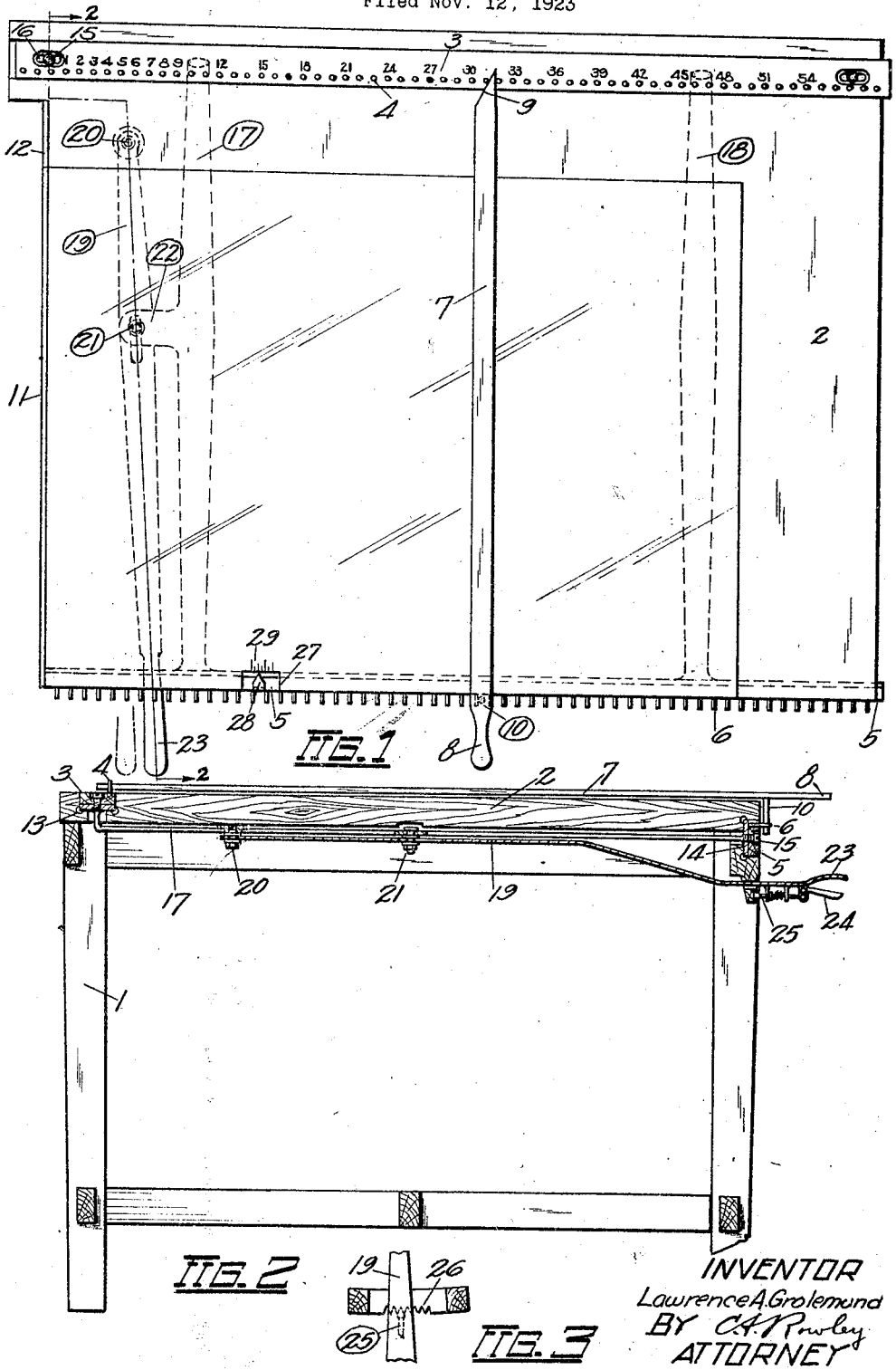
INVENTOR
Lawrence A. Grolemund
BY C.A. Rowley
ATTORNEY Patented Mar. 2, 1926.

1,574,965

UNITED STATES PATENT OFFICE.

LAWRENCE A. GROLEMUND, OF CHARLESTON, WEST VIRGINIA, ASSIGNOR TO THE LIBBEY-OWENS SHEET GLASS COMPANY, OF TOLEDO, OHIO, A CORPORATION OF OHIO.

GLASS-CUTTER'S TABLE.

Application filed November 12, 1923. Serial No. 674,142.

*To all whom it may concern:*

Be it known that I, LAWRENCE A. GROLEMUND, a citizen of the United States, residing at Charleston, in the county of Kanawha and State of West Virginia, have invented new and useful Improvements in Glass-Cutters' Tables, of which the following is a specification.

This invention relates to an improved form of glass cutter's table. More particularly, the invention relates to a table on which sheets of glass, whose dimensions are measured in fractional inches, may be squared, measured, and cut.

The usual form of glass cutter's table now in commercial use, embodies a pair of parallel scale members positioned adjacent opposite edges of the table top, and each formed with a row of spaced pins for positioning and holding the straight-edge which guides the cutting tool. One previously squared edge of the sheet of glass will be lined up with a fixed gauging edge of the table, and the straight-edge will then be positioned against the appropriate pins and the glass scored by manually drawing a cutting tool along one side of the straight-edge. Usually the pins are so spaced that an even number of inches will be measured from the gauging edge of the table to the score line. If it is desired to measure the sheet in fractional inches on such a table, it is necessary to move the zero edge of the sheet in from the fixed table edge a distance equal to one inch minus the fraction to be added, and then place the straight-edge against the pins marked for one inch greater than the measurement desired. This is a crude and inaccurate method since it is rather difficult to maintain these edges of the sheet and table parallel.

According to the present invention the two scale members carrying the positioning and holding pins are movable lengthwise of the table and means is provided for simultaneously adjusting these two slides the desired fraction of an inch away from the fixed table edge. If the straight-edge is then positioned against the pins for the desired even number of inches the fractional inch measurement will automatically be added. The glass sheet is lined up even with the fixed edge of the table as is the case when the table is normally used for measuring even inches.

The invention will be more clearly understood from the following detailed description of one preferred form of the apparatus.

In the accompanying drawings:

Fig. 1 is a plan view of the table with a sheet of glass and the straight-edge in position thereon.

Fig. 2 is a vertical section through the table taken substantially on the line 2—2 of Fig. 1.

Fig. 3 is a detail view showing the locking sector for the adjusting lever.

The table 1 is of ordinary construction having a rigid top member 2 usually constructed of wood. If desired, this top may be covered with any suitable material to prevent injury to the surfaces of the glass sheets laid thereon. Near the rear edge of the table and parallel therewith a strip or bar 3, preferably of metal, is adjustably mounted within a groove in the table top so that its upper face will be substantially flush with the surface of the table. This strip 3 carries a series of small vertically projecting pins 4. These pins are usually spaced at equal intervals of one inch. A similar strip 5 carrying horizontally projecting pins 6 is mounted in the vertical front face of the table near the upper surface thereof. The straight-edge 7 is provided with a handle 8 at one end, and the opposite end is pointed as at 9 so that it may be projected between two of the measuring pins 4 on bar 3. A pin 10 projects downwardly from the lower face of straight-edge 7 adjacent the handle 8, and this pin is adapted to be positioned between a pair of the horizontally projecting pins 6 on bar 5. The pins 4 and 6 are so proportioned and spaced that when the straight-edge 7 is properly positioned between the appropriate pins 4 and 6, a cutting-tool drawn along the right-hand side of the straight-edge, as shown in Fig. 1, will make a score line at some even number of inches from the fixed measuring edge 11 of the table. Usually a metallic angle bar 12 is inset in this edge 11 of the table to provide a permanent edge from which measurements are made, and over which the glass sheet may be conveniently cracked off at the score line. All of the above substantially illustrates a common form of table now in use and well adapted for cutting sheets measured in even inches. However, if it is desired with such a table to cut sheets measured in fractional inches, it is necessary to move the zero edge of the sheet inward the desired fraction of an inch from the measuring edge 11 of the table, in order that this fraction will be added to the even inches measured on the scales on bars 3 and 5.

In the improved form of table here disclosed, the bars 3 and 5 are not directly secured to the table 1, but are adjustably mounted on slide bars 13 and 14, respectively. Set screws 15 pass through slots 16 in the bars 3 and 5 and screw into the supporting slides 13 or 14. The slides 13 and 14 are rigidly connected by suitable cross-braces such as 17 and 18 beneath the table top, so that the two slides will travel together as a unit. A lever 19, pivoted at one end 20 to the lower side of the table, is intermediately connected by pin and slot connection 21 with a portion 22 of brace-member 17. The other end of lever 19, which projects somewhat beyond the front of table 1, is in the form of a handle 23. The handle 23 includes a bell crank lever 24, which operates the spring pressed ratchet 25 engaging with locking segment 26 mounted beneath the forward edge of the table. A small portion of the table top is cut away at 27, and in this cut-away portion a pointer 28 mounted on slide bar 5 is movable along a fixed scale 29 in the adjacent end of the table top. Scale 29 is graduated in fractions of an inch.

When the table is to be used for cutting sheets measured in even inches, the hand lever 23 will be so positioned that locking ratchet 25 is in the first notch of locking segment 26, and the pointer 28 is opposite the zero point on scale 29. At this time the two slides 3 and 5 will be so positioned in their slideways that none of the ends of the slides project beyond the edges of the table. If now it is desired to cut sheets measured in fractional inches, for example 32½ inches, the operator will grasp handle 23, unlocking ratchet 25, and swing the lever 19 and slides 3 and 5 to the right until pointer 28 is opposite the ½ inch mark on scale 29. When handle 23 is released the ratchet 25 will engage the corresponding notch in segment 26 and lock the parts in this position. Then by placing straight-edge 7 between the proper pins 4 and 6 so that the right-hand side of the straight-edge is substantially opposite the pins marked 32, the score may be made, and if the sheet has been properly lined up with one edge along the fixed measuring edge 11 of the table, the sheet will be cut to the desired width of 32½ inches. This is the position of parts illustrated in the drawings. By properly manipulating the hand lever 23 any other desired fractions of an inch may be added to the even inches marked on the scales 3 and 5.

Obviously, the scales may be graduated in the metric system, or any other system of linear measurements, and the pins 4 and 6 spaced accordingly.

By means of set screws 15 operating in slots 16 the two scales 3 and 5 may be properly lined up with one another, and may be adjusted when necessary.

Claims:

1. A glass cutter's table, comprising a plane sheet supporting member, a pair of parallel measuring bars movably mounted in the member adjacent opposite edges thereof, and means for simultaneously adjusting the bars.

2. A glass cutter's table, comprising a plane sheet supporting member, a pair of parallel measuring bars movably mounted in the member adjacent opposite edges thereof, means for simultaneously moving the bars, means for locking the bars in adjusted position, and an indicator for measuring the extent of adjustment.

3. The combination of a table having a plane sheet supporting surface, a pair of parallel measuring bars movably mounted in the table adjacent opposite edges of the supporting surface, each bar having a series of spaced projecting pins, a straight-edge having portions to cooperate with respective pins of each series, and means for simultaneously and equally adjusting the bars longitudinally.

4. The combination of a table having a plane sheet supporting surface, a pair of parallel measuring bars movably mounted in the table adjacent opposite edges of the supporting surface, each bar having a series of spaced projecting pins, a straight-edge having portions to cooperate with respective pins of each series, a rigid frame to which the two bars are secured, and means for adjusting the frame longitudinally of the table.

5. The combination of a table having a plane sheet supporting surface, a pair of parallel measuring bars movably mounted in the table adjacent opposite edges of the supporting surface, each bar having a series of spaced projecting pins, a straight-edge having portions to cooperate with respective pins of each series, means for simultaneously and equally adjusting the bars longitudinally, and an indicator for measuring the amount of adjustment.

6. The combination of a table having a plane sheet supporting surface, a pair of parallel measuring bars movably mounted in the table adjacent opposite edges of the supporting surface, each bar having a series of spaced projecting pins, a straight-edge having portions to cooperate with respective pins of each series, a rigid frame to which the two bars are secured, means for adjusting the frame longitudinally of the table, and an indicator for measuring the amount of adjustment.

Signed at Charleston, in the county of Kanawha, and State of West Virginia, this 6th day of November, 1923.

LAWRENCE A. GROLEMUND.